United States Patent
Katayama (10) Patent No.: US 10,746,848 B2
(45) Date of Patent: Aug. 18, 2020

(54) IN-VEHICLE RADAR APPARATUS (71) Applicant: DENSO CORPORATION, Kariya, Aichi-pref. (JP)

(72) Inventor: Tetsuya Katayama, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 594 days.

(21) Appl. No.: 15/314,298

(22) PCT Filed: May 26, 2015

(86) PCT No.: PCT/JP2015/065065
§ 371 (c)(1),
(2) Date: Nov. 28, 2016

(87) PCT Pub. No.: WO2015/182594
PCT Pub. Date: Dec. 3, 2015

(65) Prior Publication Data
US 2017/0153315 A1   Jun. 1, 2017

(30) Foreign Application Priority Data
May 26, 2014   (JP) .................. 2014-108340

(51) Int. Cl.
*G01S 7/02*      (2006.01)
*G01S 13/87*    (2006.01)
(Continued)

(52) U.S. Cl.
CPC ............ *G01S 7/023* (2013.01); *G01S 13/345* (2013.01); *G01S 13/347* (2013.01); *G01S 13/38* (2013.01);
(Continued)

(58) Field of Classification Search
CPC ...... G01S 7/023; G01S 13/345; G01S 13/347; G01S 13/38; G01S 13/87; G01S 13/93; G01S 13/931
(Continued)

(56) References Cited

U.S. PATENT DOCUMENTS 3,760,415 A * 9/1973 Holmstrom ........... G01S 13/931
342/59
4,628,312 A * 12/1986 Hwang .................. G01S 7/006
244/190
(Continued)

FOREIGN PATENT DOCUMENTS

JP   2004109046 A  *  4/2004 ........... G01S 13/931
JP   2006300550 A  * 11/2006 ........... G01S 13/931
(Continued)

*Primary Examiner* — Timothy A Brainard
*Assistant Examiner* — Nuzhat Pervin
(74) *Attorney, Agent, or Firm* — Maschoff Brennan (57) ABSTRACT

An in-vehicle radar apparatus includes an interference determination means, a selection means, and a frequency changing means. The interference determination means determines presence or absence of interference between multifrequency CWs, which are radar waves, based on a beat signal generated by mixing a transmission signal and a received signal, which are radar waves. The selection means selects an own vehicle or an other-side apparatus, which is a party of the interference, according to an occurrence state of the interference, when the interference determination means determines that the interference is present. The frequency changing means that changes a center frequency of the multifrequency CW transmitted from the own vehicle, when the selection means selects the own vehicle.

10 Claims, 8 Drawing Sheets

(51) Int. Cl.
*G01S 13/931* (2020.01)
*G01S 13/34* (2006.01)
*G01S 13/38* (2006.01)
*G01S 13/93* (2020.01)

(52) U.S. Cl.
CPC .............. *G01S 13/87* (2013.01); *G01S 13/93* (2013.01); *G01S 13/931* (2013.01)

(58) Field of Classification Search
USPC .......................................................... 342/18
See application file for complete search history.

(56) References Cited

U.S. PATENT DOCUMENTS

| | | | | |
|---|---|---|---|---|
| 4,764,769 A * | 8/1988 | Hayworth | ............... | F41G 7/306 342/50 |
| 5,745,437 A * | 4/1998 | Wachter | .................. | G01S 17/10 342/127 |
| 7,187,321 B2 * | 3/2007 | Watanabe | ............. | G01S 13/345 342/118 |
| 7,339,518 B2 * | 3/2008 | Natsume | ................... | G01S 7/36 342/70 |
| 7,508,337 B2 * | 3/2009 | Morinaga | ............. | G01S 7/352 342/109 |
| 7,522,092 B2 * | 4/2009 | Okai | ..................... | G01S 13/931 342/70 |
| 7,728,762 B2 * | 6/2010 | Sakamoto | ................. | G01S 7/35 342/109 |
| 2004/0056793 A1 * | 3/2004 | Matsubara | ................ | G01S 7/36 342/70 |
| 2004/0119966 A1 * | 6/2004 | Iritani | ..................... | G01S 13/32 356/4.09 |
| 2006/0181448 A1 * | 8/2006 | Natsume | ............... | G01S 13/345 342/70 |
| 2007/0018886 A1 * | 1/2007 | Watanabe | ............. | G01S 13/345 342/173 |
| 2007/0200747 A1 * | 8/2007 | Okai | ..................... | G01S 13/931 342/70 |
| 2008/0106458 A1 * | 5/2008 | Honda | .................... | G01S 13/34 342/59 |
| 2008/0231496 A1 * | 9/2008 | Sakamoto | ............... | G01S 7/354 342/59 |
| 2008/0231497 A1 * | 9/2008 | Sakamoto | ................. | G01S 7/35 342/70 |
| 2009/0096661 A1 * | 4/2009 | Sakamoto | ............... | G01S 7/021 342/92 |
| 2009/0121918 A1 * | 5/2009 | Shirai | ................... | G01S 13/345 342/159 |
| 2015/0091749 A1 * | 4/2015 | von Rhein | ............ | G01S 13/582 342/107 |

FOREIGN PATENT DOCUMENTS

| | | | | |
|---|---|---|---|---|
| JP | 2008-58165 A | | 3/2008 | |
| JP | 2008058165 A | * | 3/2008 | ............. G01S 13/93 |

* cited by examiner

| TYPE OF INTERFERENCE | FREQUENCY AXIS | TIME AXIS |
|---|---|---|
| (a) FMCW × FMCW | | DIFFERENCE FREQUENCY BETWEEN TRANSMISSION WAVE AND RECEIVED WAVE / DIFFERENCE FREQUENCY BETWEEN TRANSMISSION WAVE AND INTERFERENCE WAVE (ENTERING BAND FOR A MOMENT) |
| (b) FMCW × 2FCW | | DIFFERENCE FREQUENCY BETWEEN TRANSMISSION WAVE AND RECEIVED WAVE / DIFFERENCE FREQUENCY BETWEEN TRANSMISSION WAVE AND INTERFERENCE WAVE (ENTERING BAND FOR A MOMENT) |
| (c) 2FCW × 2FCW | | DIFFERENCE FREQUENCY BETWEEN TRANSMISSION WAVE AND RECEIVED WAVE / DIFFERENCE FREQUENCY BETWEEN TRANSMISSION WAVE AND INTERFERENCE WAVE / DIFFERENCE FREQUENCY IS OBSERVED ONLY DURING OVERLAPPING TIME PERIOD |

FIG.7

IN-VEHICLE RADAR APPARATUS

TECHNICAL FIELD

The present invention relates to an in-vehicle radar apparatus that is mounted in a vehicle and, for example, detects a target by using radar waves.

BACKGROUND ART

An in-vehicle radar may receive not only reflected waves of radar waves transmitted from the in-vehicle radar of an own vehicle but also radar waves transmitted from an in-vehicle radar of another vehicle, such as an oncoming vehicle and a parallel running vehicle, present in the vicinity of the own vehicle. Thereby, so-called interference between the in-vehicle radars may occur.

Figure 5:
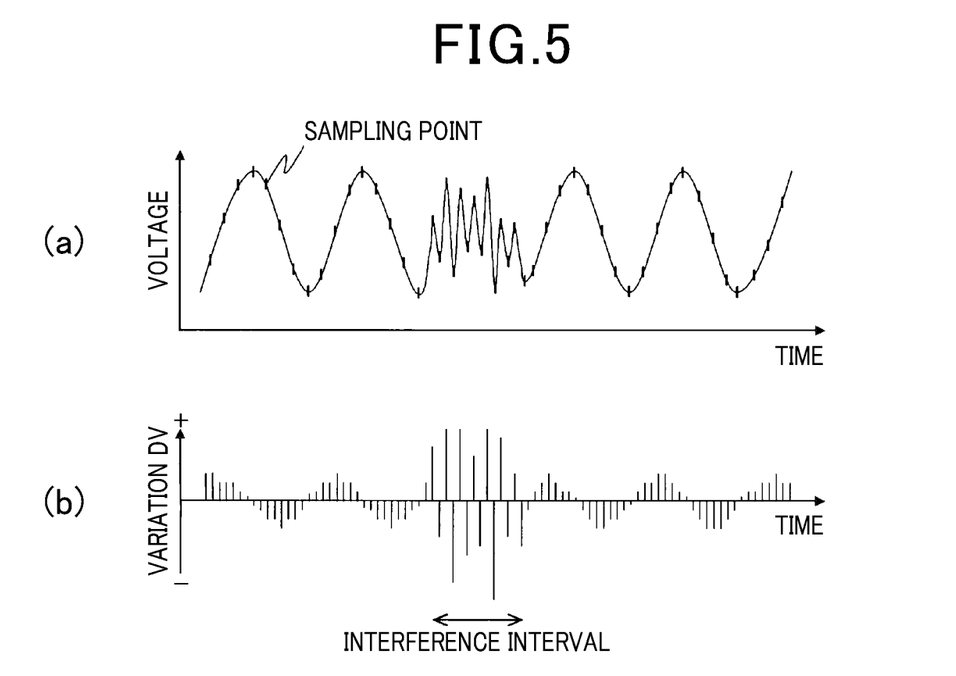
FIG. 5 is a drawing illustrating an interference interval used for determining interference.

When an FMCW is used as a radar wave, if interference occurs with an FMCW or a multifrequency CW transmitted from another apparatus, a waveform of a beat signal is formed by superimposing a waveform having a signal component having a high frequency due to interference on a waveform of a beat signal to be detected (refer to FIG. 5(a)).

Focusing on this point, techniques are known in which points are extracted where signal levels of a beat signal become maximum or minimum, and if the extracted points do not appear at periodical timings, it is determined that interference with another in-vehicle radar apparatus has occurred (for example, refer to Patent Literature 1).

CITATION LIST

Patent Literature

[Patent Literature 1] JP-A-2008-232830

SUMMARY OF THE INVENTION

Solution to Problem

Figure 6:
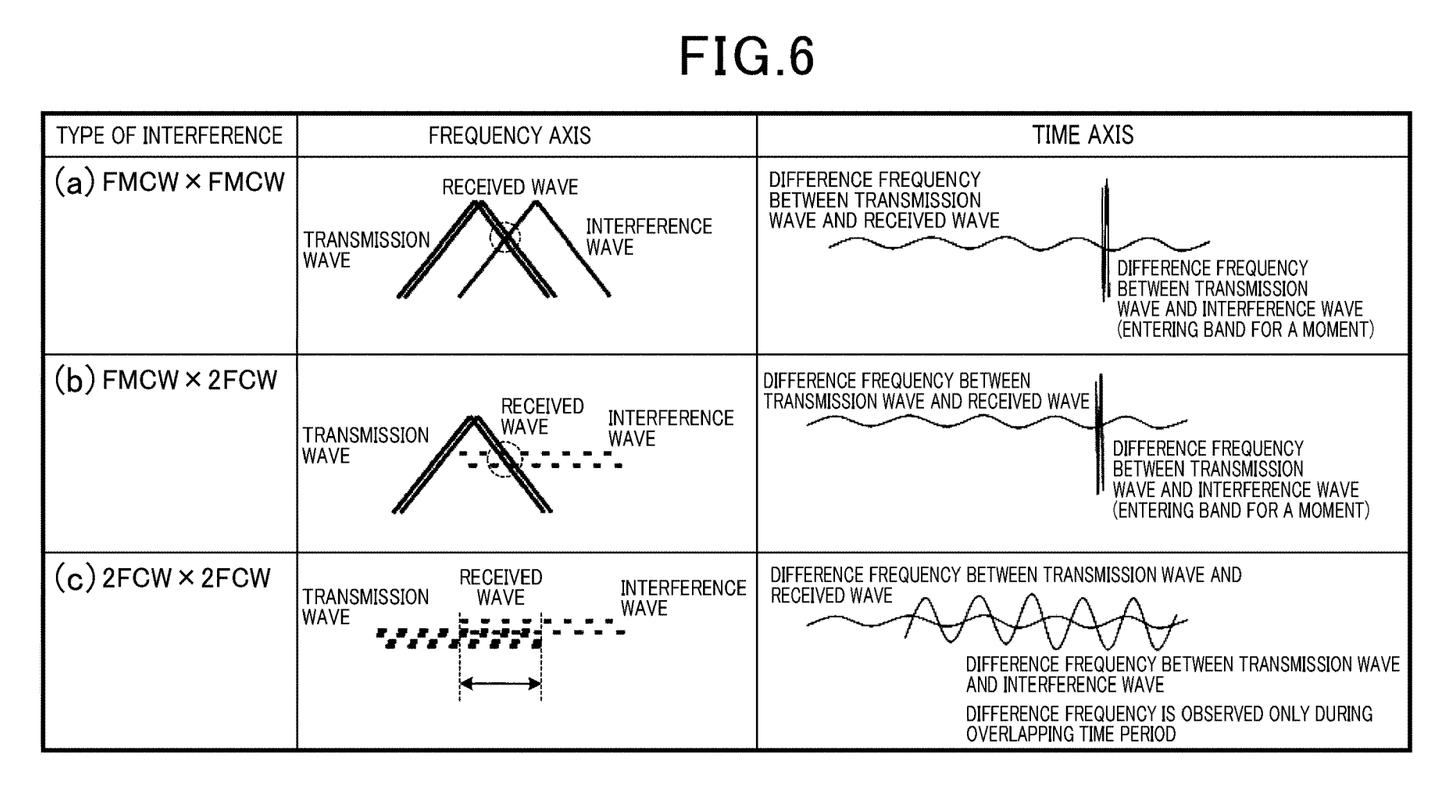
FIG. 6 is a drawing illustrating occurrence states of interference.

Meanwhile, when a transmission wave is an FMCW and an interference wave is an FMCW or a CW, the influence of the interference (difference frequency components between the transmission wave and the interference wave) may appear in the frequency range of a beat signal, which is a processing object of an in-vehicle radar apparatus. This is, as shown in FIGS. 6(a) and (b), limited to a short time period in the vicinity of the time when frequencies of radar waves, which are interfered with each other, cross each other. Hence, shaping the part of the waveform affected by the interference by software can reduce the influence of the interference.

However, when the own vehicle is using a multifrequency CW as a radar wave, if the multifrequency CW interferes with a CW wave transmitted from another apparatus (interference between multifrequency CWs), as shown in FIG. 6(b), the influence of the interference continues to be exerted while the transmission periods of the CWs overlap with each other. Hence, depending on an overlap state of the transmission periods, it may be difficult to employ the above-described approach of shaping the waveform by software.

SUMMARY OF THE INVENTION

An embodiment provides an in-vehicle radar apparatus that addresses interference between multifrequency CW radars.

An in-vehicle radar apparatus of an embodiment includes an interference determination means, a selection means, and a frequency changing means. The interference determination means determines presence or absence of interference between multifrequency CWs, which are radar waves, based on a beat signal generated by mixing a transmission signal and a received signal, which are radar waves. The selection means selects an own vehicle or an other-side apparatus, which is a party of the interference, according to an occurrence state of the interference, when the interference determination means determines that the interference is present. The frequency changing means changes a center frequency of the multifrequency CW transmitted from the own vehicle, when the selection means selects the own vehicle.

DESCRIPTION OF THE EMBODIMENTS

Hereinafter, embodiments of the present invention will be described with reference to the drawings.

First Embodiment

<Overall Configuration>

Figure 1:
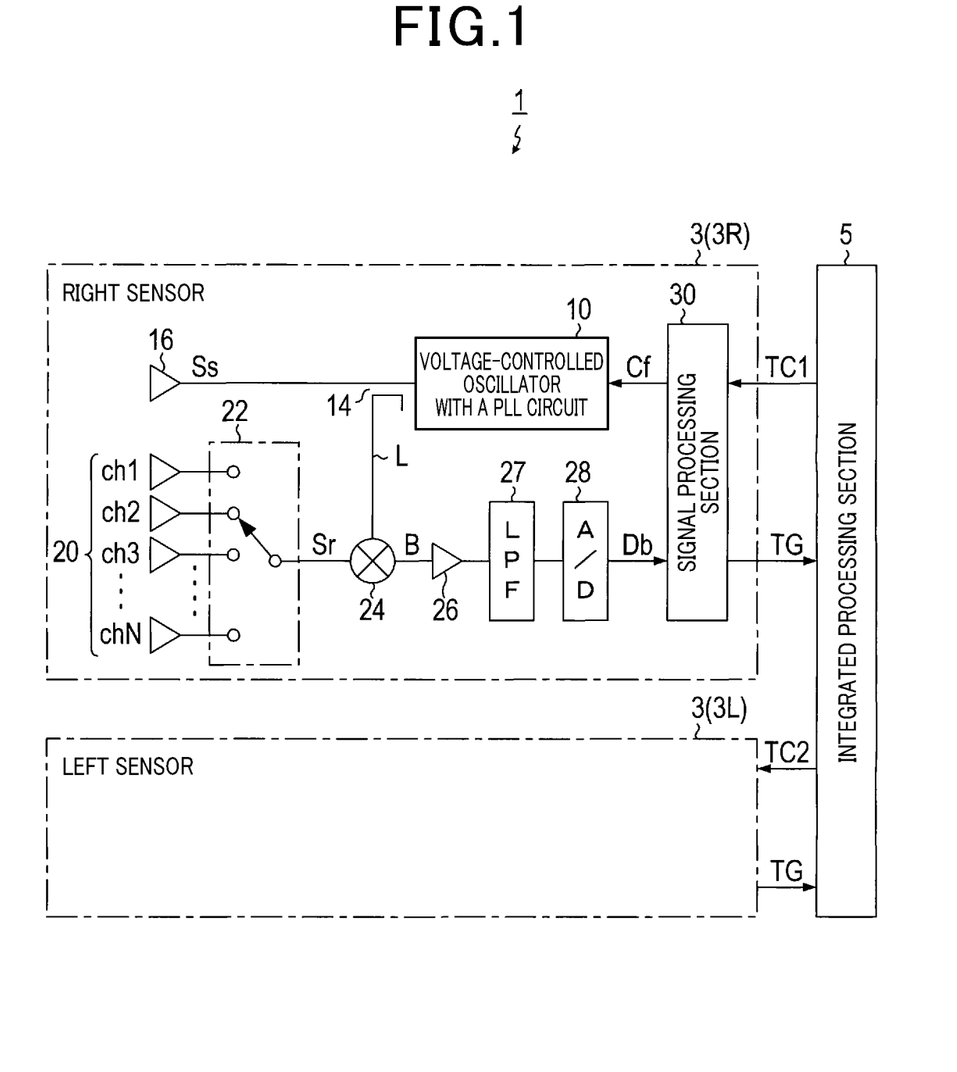
FIG. 1 is a block diagram showing an overall configuration of an in-vehicle radar apparatus.

An in-vehicle radar apparatus 1 to which the present invention is applied includes, as shown in FIG. 1, a pair of radar sensors 3 (3R, 3L) and an integrated processing section 5.

<Radar Sensors>

The radar sensors 3 are respectively disposed at both of the right end and the left end of a bumper provided at the rear end of a vehicle, and have configurations similar to each other. Hereinafter, if particularly needed to be identified, the radar sensor 3 located at the right end of the bumper is referred to as a right sensor 3R, and the radar sensor 3 located at the left end of the bumper is referred to as a left sensor 3L. The right sensor 3R is set so as to have a search range ranging from the right lateral side of the vehicle to the right rear side of the vehicle. The left sensor 3L is set so as to have a search range ranging from the left lateral side of the vehicle to the left rear side of the vehicle.

The radar sensor 3 includes a voltage-controlled oscillator 10 with a PLL (Phase Locked Loop) circuit, a distributor 14, a transmitting antenna 16, a receiving antenna section 20, a receiving switch 22, a mixer 24, an amplifier 26, an LPF (Low Pass Filter) 27, an A/D (analog-digital) converter 28, and a signal processing section 30.

The voltage-controlled oscillator 10 with a PLL circuit is known and includes a reference signal oscillator, a divider, a phase comparator, and a voltage-controlled oscillator. The voltage-controlled oscillator 10 controls the dividing number of the divider to generate a signal within a millimeter waveband and having a frequency according to a frequency control signal Cf received from the signal processing section 30. The distributor 14 divides electric power of an output of the voltage-controlled oscillator 10 with a PLL circuit into a transmission signal Ss and a local signal L, and supplies the transmission signal Ss to the transmitting antenna 16, and the local signal L to the mixer 24. The transmitting antenna 16 radiates a radar wave according to the transmission signal Ss.

The receiving antenna section 20 includes N antennas receiving radar waves. The receiving switch 22 selects any one of the antennas configuring the receiving antenna section 20 in series and supplies a received signal Sr received from the selected antenna to the mixer 24. The mixer 24 mixes the received signal Sr with a local signal L to generate a beat signal B and supplies the beat signal B to the amplifier 26. The amplifier 26 amplifies the beat signal B and supplies the amplified beat signal B to the LPF 27. Defining a sampling frequency fs in the A/D converter 28 as fs, the LPF 27 removes signal components having a frequency of fs/2 or more from the beat signal B amplified by the amplifier 26 and supplies the obtained beat signal B to the A/D converter 28. The A/D converter 28 samples the output of the LPF 27 with the sampling frequency fs and converts the sampled output to digital data (hereinafter, referred to as "sampling data") Db, and then supplies the digital data Db to the signal processing section 30.

Note that the N antennas configuring the receiving antenna section 20 are respectively assigned to channels ch1 to chN. When a sampling frequency per one channel is defined as fps, the sampling frequency of the A/D converter 28 is set to fs=N×fps. In addition, when the frequency domain of the beat signal B corresponding to the region of detection of a target is defined as a detection frequency domain, the sampling frequency fps per one channel is set to a value more than two times larger than an upper limit frequency (maximum beat frequency) of the detection frequency domain (preferably, four times or more larger than the upper limit frequency), so as to perform so-called oversampling.

The signal processing section 30 is mainly configured by a known microcomputer including a CPU, a ROM, and a RAM. Furthermore, the signal processing section 30 includes an arithmetic processing unit for performing signal processing such as the fast Fourier transformation (FFT) processing for the data captured through the A/D converter 28. The signal processing section 30 performs at least a transmission process and a target detection process. In the transmission process, the frequency control signal Cf is generated in accordance with a timing signal TCi (TC1 for the right sensor 3R, TC2 for the left sensor) received from the integrated processing section 5 and according to a predetermined schedule to transmit a desired laser wave. In the target detection process, information (target information) TG on the target, which has reflected a radar wave, is generated based on sampling data Db obtained during a time period during which the radar wave is transmitted, and the target information TG is supplied to the integrated processing section 5.

Hereinafter, the transmission process and the target detection process performed by the signal processing section 30 will be described.

<Transmission Process>

Figure 2:
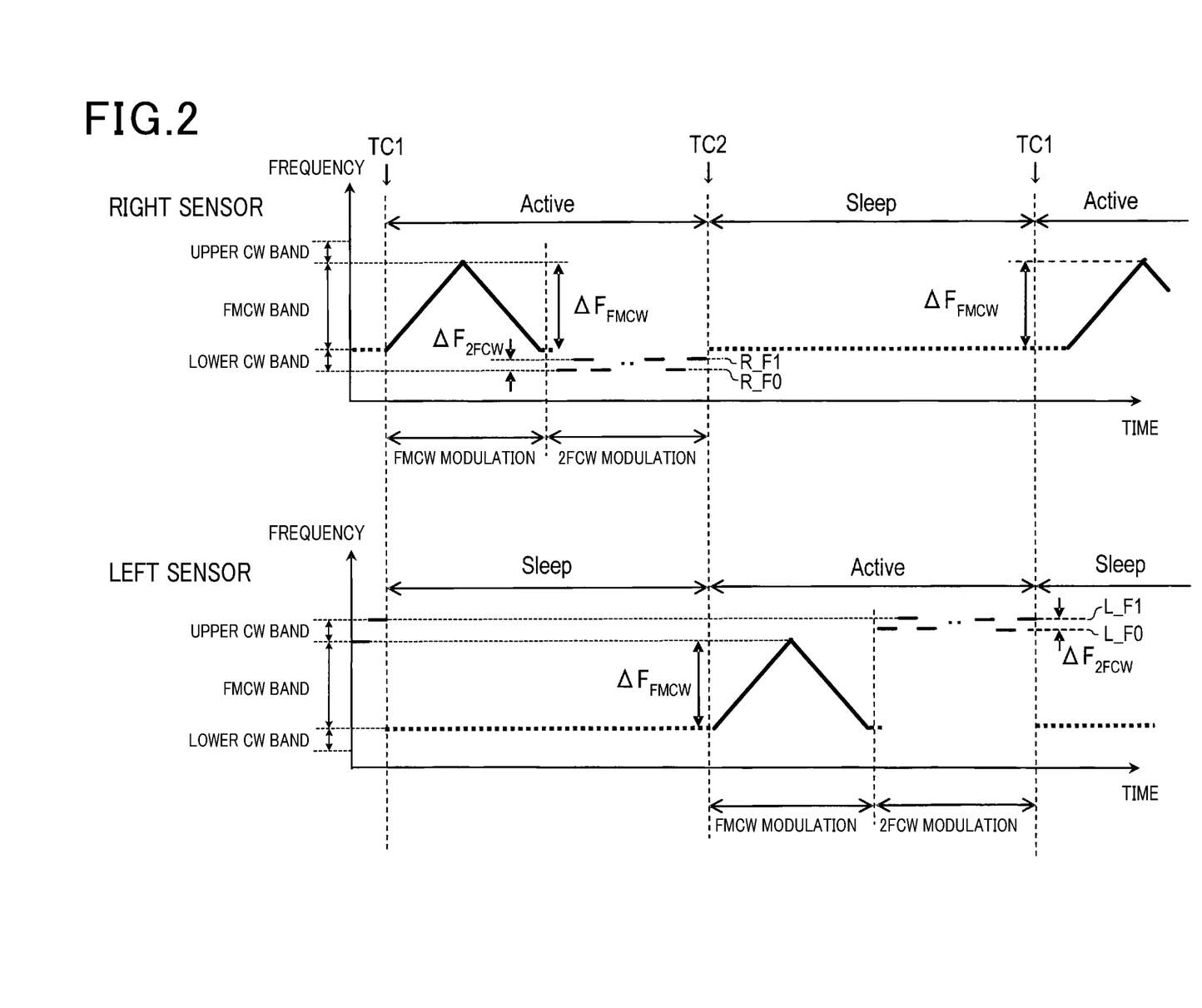
FIG. 2 is a timing diagram showing operation schedules of laser sensors according to a first embodiment.

In the transmission process, as shown in FIG. 2, when the timing signal Tci is input, the frequency control signal Cf is generated so that a radar wave is transmitted only during a predetermined constant operation period (Active). Note that the timing signal TCi is controlled so as to be alternately input to the right sensor 3R and the left sensor 3L, and so that, at all times, any one of the sensors is in an operation period, and the other of the sensors is in an idle period (Sleep).

The sensor operates as an FMCW radar during the first half of the operation period, and operates as a two frequency CW (2FCW) radar during the second half of the operation period. Note that the frequency band of 200 MHz width (24.05 GHz to 24.25 GHz) determined by the radio law is divided into three frequency bands consisting of a lower CW band of 10 MHz width (24.05 GHz to 24.06 GHz), an FMCW band of 180 MHz width (24.06 to 24.24 GHz), and an upper CW band of 10 MHz width (24.24 GHz to 24.25 GHz). The FMCW band is assigned to FMCW modulation (common to the right sensor 3R and the left sensor 3L). The lower CW band is assigned to 2FMCW modulation of the right sensor 3R. The upper CW band is assigned to 2FMCW modulation of the left sensor 3L.

For the FMCW modulation, all frequency domains of the FMCW band are used to generate an FMCW having a modulated width $\Delta F_{FMCW}$ of 180 MHz.

Figure 3:
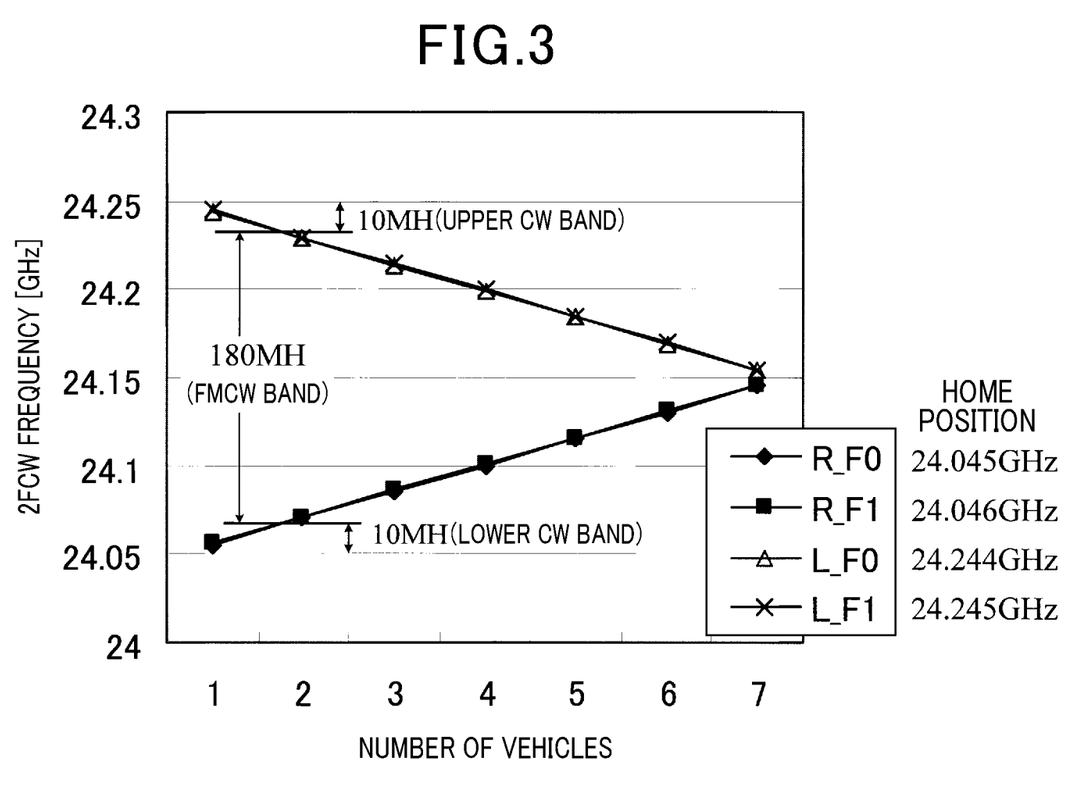
FIG. 3 is a diagram illustrating contents of control of changing frequencies of two frequency CWs when interference between 2FCWs is detected.

For the 2FMCW modulation, two frequencies F0, F1 (=F0+$\Delta F_{2FCW}$) whose difference is set to $\Delta F_{2FCW}$=1 MHz. Hereinafter, two frequencies used in the right sensor 3R are expressed by R_F0 and R_F1, and the center frequency of the two frequencies is expressed by RF. Two frequencies used in the left sensor 3L are expressed by L_F0 and L_F1, and the center frequency of the two frequencies is expressed by LF. As shown in FIG. 3, in the right sensor 3R, in a state where the frequencies R_F0 and R_F1, which are set so that the center frequency RF agrees with the lower limit frequency of the lower CW band, are defined as home positions, the center frequency RF is set so as to be increased by a predetermined stepped frequency $F_{STEP}$. In contrast, in the left sensor 3L, in a state where the frequencies L_F0 and L_F1, which are set so that the center frequency LF agrees with the upper limit frequency of the upper CW band, are defined as home positions, the center frequency LF is set so as to be decreased by the stepped frequency $F_{STEP}$. Here, the stepped frequency is set to $F_{STEP}$=15 MHz, and the number of steps of switching the frequency including the home position is set to 7.

Note that when the radar sensor 3 is activated, the frequency used for the 2FMCW modulation is initially set to the home position. In addition, the stepped frequency $F_{STEP}$ is set based on cut-off characteristics of the LPF 27, and the difference between the upper limit frequency of the pass band and the frequency by which the amplitude becomes sufficiently smaller (e.g. 1/10) with respect to the upper limit frequency.

<Target Detection Process>

The target detection process includes an FMCW target detection process, which is a process based on sampling data obtained during an FMCW modulation time period, and a 2FCW target detection process, which is a process based on the sampling data obtained during a 2FCW modulation time period. The target detection process is performed during a stop time period during which radar waves are not transmitted and received. Since the FMCW target detection process is known in addition to measures taken when interference with a radar wave (FMCW, 2FCW) transmitted from another vehicle, descriptions of the FMCW target detection process is omitted.

Figure 4:
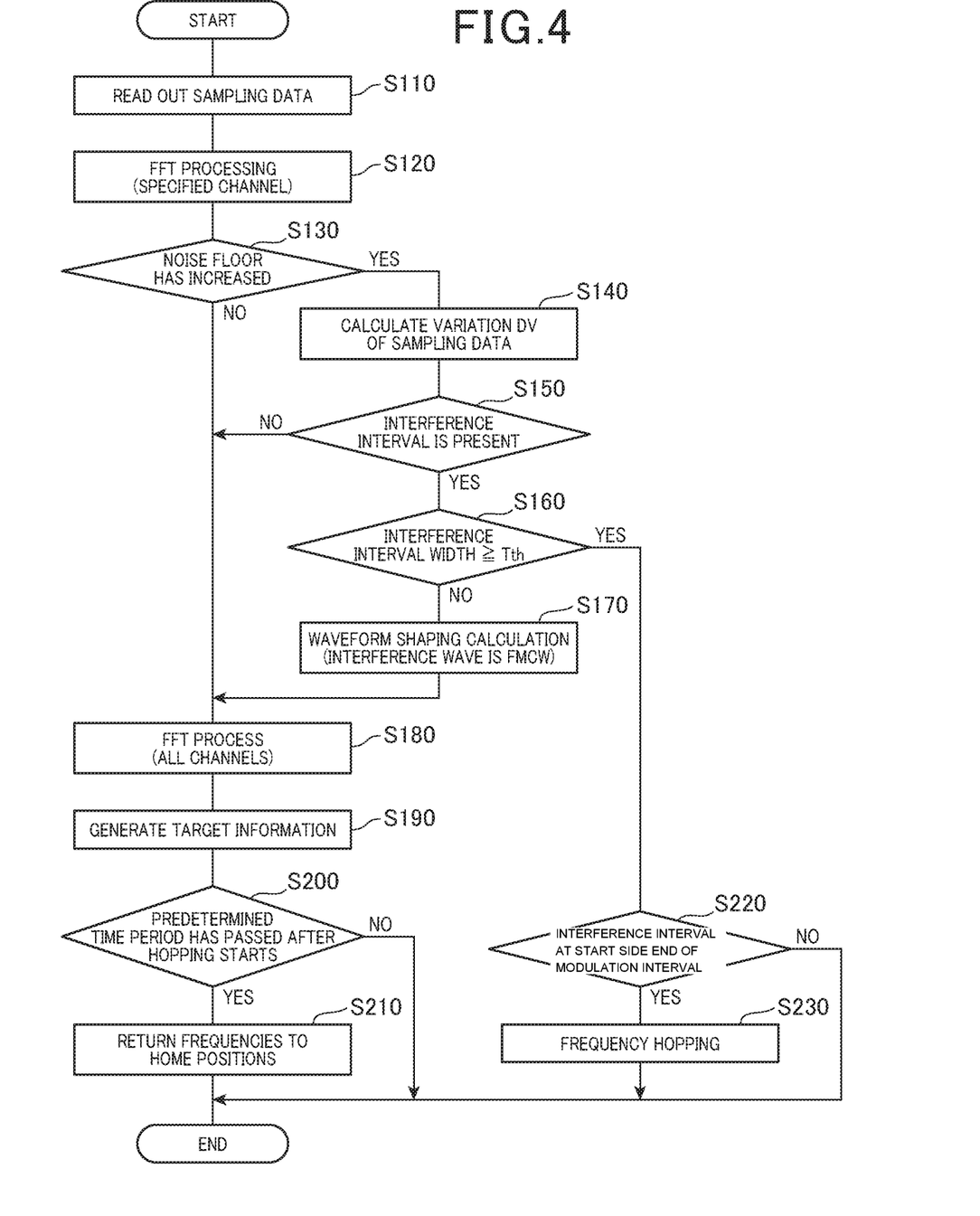
FIG. 4 is a flowchart of a 2FCW target detection process according to the first embodiment.

Hereinafter, the 2FCW target detection process is described with reference to the flowchart shown in FIG. 4.

When the present process starts, first in step S110, the CPU (hereinafter, referred to as signal processing section 30) of the signal processing section 30 reads out the sampling data Db obtained during the 2FCW modulation time period. In the subsequent step S120, the signal processing section 30 performs frequency analysis processing (herein, FET processing) for the sampling data obtained for one predetermined specified channel.

In the subsequent step S130, the signal processing section 30 determines whether or not a noise floor calculated from the processing result of step S120 has increase by a predetermined value or more compared with a reference value (with respect to the reference value) of a noise floor calculated based on the processing results of the last and earlier processing cycles. If the noise floor has not increased (S130: NO), it is assumed that interference has not occurred, and the process proceeds to step S180. If the noise floor has increased (S130: YES), it is assumed that interference has occurred, and the process proceeds to step S140.

That is, in the case where the interference wave is an FMCW, a difference frequency component in the vicinity of the intersection of frequencies of a transmission wave (herein, 2FCW) from the own apparatus and the interference wave (refer to FIG. 6(a)) appears in a frequency band (hereinafter, referred to as "detection object frequency band") required for detecting a target. The difference frequency component increases the noise floor. In contrast, in the case where the interference wave is a 2FMCW, if the transmission wave from the own vehicle and the interference wave use the same frequencies F0 and F1, noise of a difference frequency $\Delta F_{2FMCW}$ (=F1−F0) of the 2FCW appears due to the difference between transmission timings of the both apparatuses. Although the difference frequency component is out of the detection object frequency band, the difference frequency component cannnot be sufficiently removed by the LPF 27 because the A/D converter 28 performs oversampling. Hence, as a result of FFT processing, the difference frequency component is folded back to the detection object frequency band, thereby increasing the noise floor. That is, by examining the noise floor, the presence or absence of interference can be determined regardless of whether the interference wave is an FMCW or 2FCW.

In step S140, based on the sampling data (refer to FIG. 5(a)), the signal processing section 30 calculates a variation DV of the signal level of a beat signal between sampling points (refer to FIG. 5(b)). In the subsequent step S150, the signal processing section 30 determines whether or not an interference interval is present in which the absolute value |DV| of the variation becomes a predetermined voltage threshold value Vth or more. The voltage threshold value Vth is set to a lower limit value of the variation DV detected when a 1 MHz or more noise component is superimposed on the beat signal.

If an interference interval is not present (S150: NO), it is assumed that interference requiring countermeasures has not occurred, and the process proceeds to S180. If an interference interval is present (S150: YES), it is assumed that countermeasures are required for the interference, and the process proceeds to S160.

In S160, the signal processing section 30 determines whether or not the length of the interference interval is a predetermined time threshold value Tth or more. The time threshold value Tth is previously set based on an observation result during a period of duration during which the influence of interference appears in the detection object frequency band. Specifically, the time threshold value Tth is set to a value larger than the length of the period of duration.

If the length of the interference interval is less than the time threshold value Tth (S160: NO), it is determined that the interference wave is an FMCW, and the process proceeds to S170. In contrast, if the length of the interference interval is the time threshold value Tth or more (S160: YES), it is determined that the interference wave is a 2FCW, and the process proceeds to S220.

In S220, the signal processing section 30 determines whether or not the interference interval has been generated at a start side end of a 2FCW modulation interval. That is, as long as transmission timings of the transmission wave from the own apparatus and the interference wave do not agree with each other, as shown in FIG. 6(c), the interference interval is generated at a start side end or an end side end of the transmission wave. In the apparatus, which is a party of the interference, the interference interval is generated at the side end opposite to that of the own vehicle. By utilizing this relationship, the apparatus generating the interference can be specified.

If the interference interval has been generated at the end side end of the 2FCW modulation interval (S220: NO), the present process ends without change. If the interference interval has been generated at the start side end (S220: YES), in S230, the signal processing section 30 sets the frequency of the 2FCW so as to undergo hopping (to change the center frequency in one step in the direction away from the home position), then the present process ends. Thereby, in the 2FCW modulation during the next operation period, the frequency after the hopping is used. Note that if the currently set center frequency is already in the top step, a notification of this state may be made to the driver to stop outputting processing results during a predetermined time period, or the center frequency may be shifted to the home position.

In S170, since the interference interval is short, the signal processing section 30 performs waveform shaping calculation for smoothing a waveform during the interference interval, and the process proceeds to S180. In the waveform shaping calculation, the sampling data during the interference interval is corrected so that waveforms before and after the interference interval are continuously connected. This process is performed for the sampling data of all the channels.

In S180, based on the sampling data obtained in the former S110, or the sampling data after the waveform shaping calculation if the waveform shaping calculation has been performed in the former S170, the signal processing section 30 performs frequency analysis (in the present embodiment, FFT processing) of a beat signal by each channel and by each of the frequencies F0 and F1.

Note that, in FFT processing, although data which has undergone oversampling may be used without change, data may be used which has undergone down-conversion so that unnecessary frequency components out of the detection object frequency band are removed (data thinned out on the time axis).

In the subsequent S190, the signal processing section 30 performs a process for generating target information TG including at least a distance, a speed, and a direction from the processing result of S180 by using a well-known method of a 2FCWradar, and outputting the target information TG to the integrated processing section 5. Then, the present process proceeds to S200.

In S200, the signal processing section 30 determines whether or not the elapsed time from the shift of the frequency from the home position in S230 described earlier has exceeded predetermined waiting time. If the elapsed time has not exceeded the waiting time (S200: NO), the present process ends without change. In contrast, if the elapsed time has exceeded the waiting time (S200: YES), in S210, the signal processing section 30 returns the settings of the frequencies F0 and F1 used in the 2FCW modulation to the home positions, and the present process ends.

Note that the waiting time may be set longer than duration time of interference in a condition in which the interference state continues for the longest time among the conditions in which the interference occurs. For example, an average time may be used which is required for moving some distance by starting an engine in a parking area or the like. In this case, a setting of about 8 seconds can be considered.

<Operation>

In the in-vehicle radar apparatus 1, the presence or absence of interference is determined based on the increase of a noise floor, and it is distinguished whether the interference wave is an FMCW or a 2 FCW from the length of the interference interval. Then, if the interference wave is an FMCW, sampling data is corrected so that the waveform of the beat signal corresponding to the interference interval is shaped, and FFT processing and generation of the target information are performed by using the corrected data. In addition, if the interference wave is a 2FCW, the sampling data is discarded, and the frequency of the 2FCW undergoes hopping only by the own apparatus or the other-side apparatus specified based on the state of the interference. Thereby, reoccurrence of the interference can be suppressed during a 2FCW time period in the next operation period.

<Advantageous Effects>

As described above, according to the in-vehicle radar apparatus 1, when interference between 2FCWs has occurred, the center frequency of the 2FCW is changed only in the own apparatus or the other-side apparatus. Hence, continuous occurrence of interference can be avoided.

Hence, even when vehicles in which the same type of in-vehicle radar apparatuses 1 are mounted run parallel to each other on a road, pass each other, or are adjacent to each other in a parking area or the like, a target can be detected with high accuracy while the influence of the interference is reduced. Hence, the reliability of various controls utilizing the detection result can be improved.

Second Embodiment

In the second embodiment, since the basic configuration is similar to that of the first embodiment, the descriptions of the common configurations are omitted, and differences from the first embodiment are mainly described.

In the first embodiment described above, when interference between the 2FCWs has occurred, the center frequency of the 2FCW is changed in a regular manner only in the own apparatus or the other-side apparatus. In contrast, the second embodiment differs from the first embodiment in that the center frequency of the 2FCW is randomly changed in both the own apparatus and the other-side apparatus.

Hereinafter, the transmission process and the 2FCW target detection process performed by the signal processing section 30 will be described.

<Transmission Process>

Figure 7:
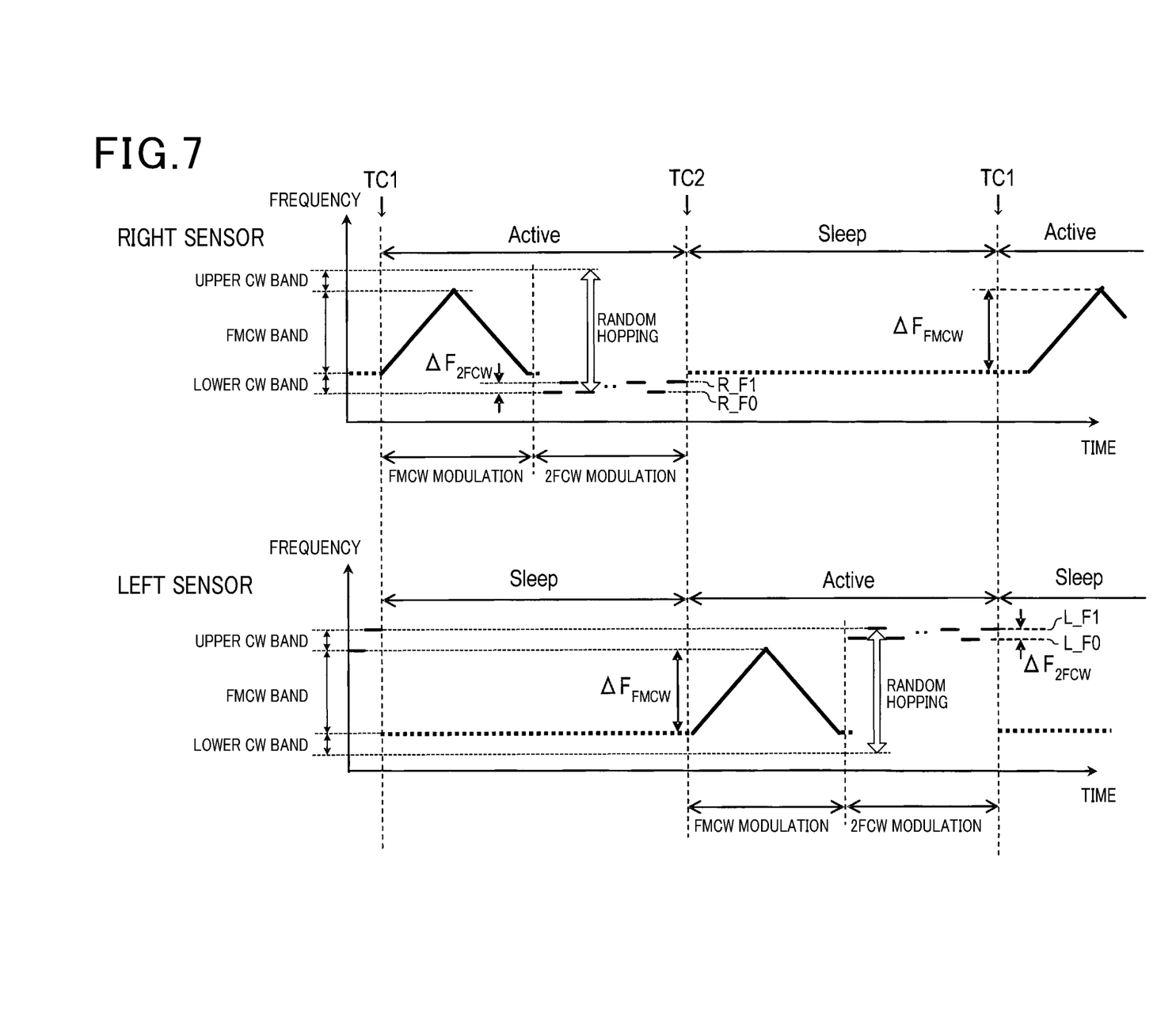
FIG. 7 is a timing diagram showing operation schedules of laser sensors according to a second embodiment.

In the transmission process, as shown in FIG. 7, only the setting of the center frequency of the 2FCW, which is used when the sensor operates as a 2 FCW radar, in the second half during the operation period differs from that of the first embodiment.

Specifically, the full 200 MHz width (24.05 GHz to 24.25 GHz) determined by the radio law is defined as an acceptable frequency band. In the acceptable frequency band, one center frequency to be used is randomly selected from 10000 types of center frequencies sets every 20 kHz step. However, when the apparatus is activated, the lower limit frequency of the acceptable frequency band is assigned as an initial value of the center frequency used in the 2FMCW modulation of the right sensor 3R. The upper limit frequency of the acceptable frequency band is assigned as an initial value of the center frequency used in the 2FMCW modulation of the left sensor 3L. Note that the initial value of the center frequency is not limited to the above, but may be randomly assigned from the first.

<2FCW Target Detection Process>

Figure 8:
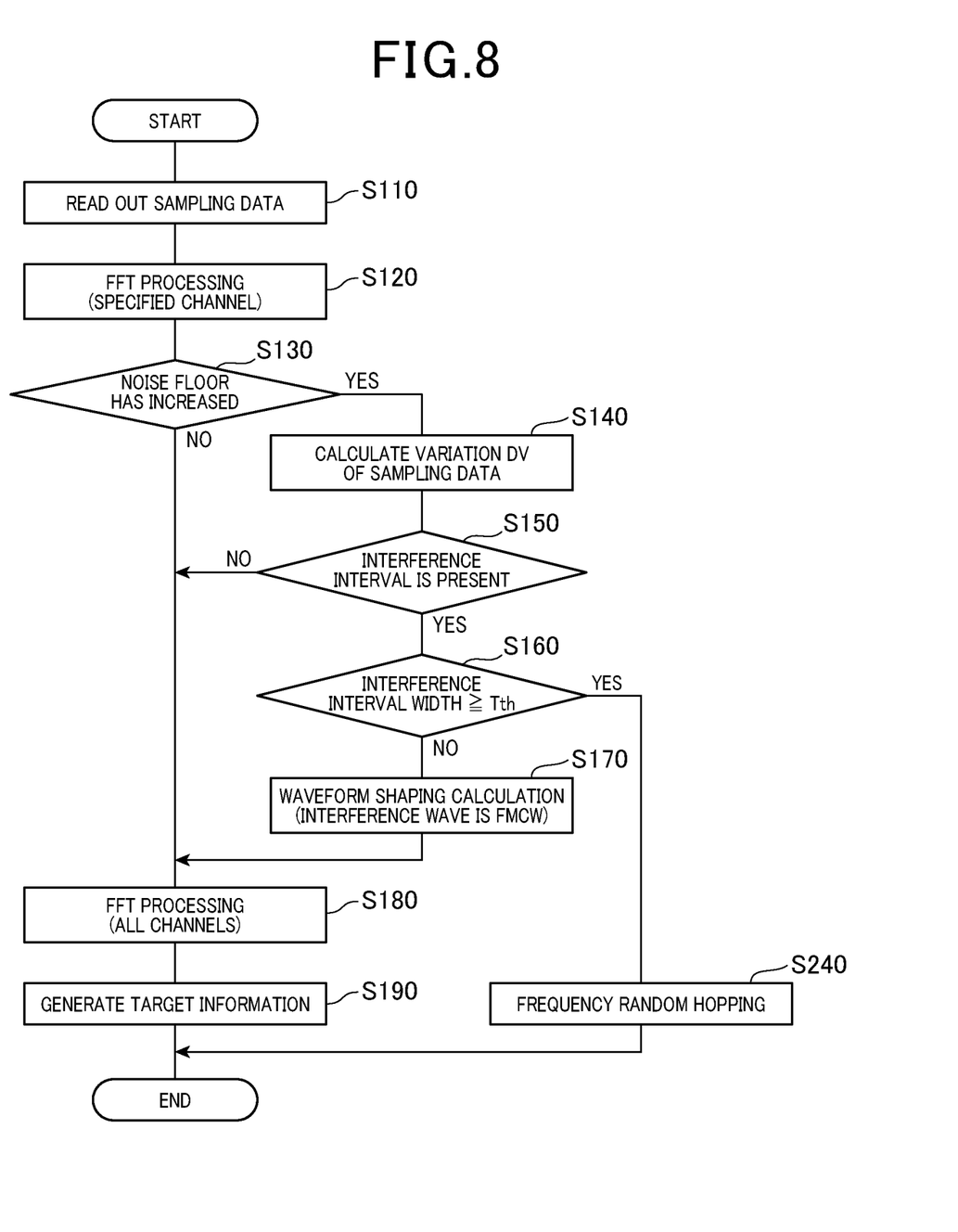
FIG. 8 is a flowchart of a 2FCW target detection process according to the second embodiment.

Next, a 2FCW target detection process performed instead of the 2FCW target detection process (refer to FIG. 4) of the first embodiment will be described with reference to the flowchart in FIG. 8. Note that since S110 to S190 are similar to those in the first embodiment, the descriptions thereof are omitted. In addition, in the present embodiment, S200 to S230 in the first embodiment are omitted, and S240 is performed instead of S220 and S230.

That is, in S160, if the length of the interference interval is the time threshold value Tth or more, and if it is determined that the interference wave is a 2FCW (S160: YES), in S240, the signal processing section 30 sets the frequency of the 2FCW so as to randomly undergo hopping (change the center frequency by randomly selecting any one center frequency from the 10000 types of settings in the acceptable frequency band), and the present process ends.

<Operation>

In the present embodiment, if interference between 2FCWs is detected, the sampling data is discarded, and the frequency of the 2FCW randomly undergoes hopping by both the own apparatus and the other side apparatus, which have detected the interference. Thereby, reoccurrence of the interference can be suppressed during a 2FCW time period in the next operation period.

<Advantageous Effects>

According to the second embodiment described above in detail, the advantageous effects similar to those of the first embodiment previously described can be obtained by simpler control.

Other Embodiments

Hereinbefore, embodiments of the present invention are described. However, needless to say, the present invention is not limited to the above embodiments and can be variously implemented.

(1) In the above embodiments, the integrated processing section 5 is provided separately from the signal processing sections 30. However, one of the signal processing sections 30 of the right sensor 3R and the left sensor 3L may be configured to also serve as the integrated processing section 5. The signal processing sections 30 may be separated from the sensors 3R and 3L so as to be integrated with the integrated processing section 5.

(2) In the above embodiments, when the interference wave is a 2FCW, it is determined whether the center frequency of the 2FCW is changed by the own apparatus or the other-side apparatus, at the timing when interference occurs during the 2FCW time period. However, the manner of the determination is not limited to this. For example, when a configuration is provided so as to perform IQ detection in a receiving circuit, the determination may be made based on which of the transmission wave and the interference wave has a higher frequency.

(3) In the above embodiments, although a fixed value is used as a waiting time, which is the time period to the frequency of the home position, when the center frequency of the 2FCW undergoes hopping, the waiting time may be changed depending on the situation. For example, the waiting time may be variably set depending on the own vehicle speed. In this case, specifically, it can be considered that when the own vehicle speed is less than 10 km/h, the waiting time is set to 8 seconds, and when the own vehicle speed is 10 km/h or more, the waiting time is set to 4 seconds. In addition, the waiting time may be variably set depending on the setting of gears of the transmission. In this case, specifically, it can be considered that when the gears are set to forward travel, the waiting time is set to 4 seconds, and when the gears are set to reverse travel, the waiting time is set to 8 seconds. That is, in a situation where an average time required to eliminate the interference becomes longer, the waiting time may be set to be longer. In an opposite situation, the waiting time may be set to be shorter.

(4) In the above embodiments, examples are described in which the present invention is applied to a 2FCW. Alternatively, the present invention may be applied to a multifrequency CW using three or more frequencies.

(5) Components of the present invention are conceptual, and are not limited to the above embodiments. For example, functions of one component may be distributed to a plurality of components, or functions of a plurality of components may be integrated into one component. Alternatively, at least part of the configurations of the above embodiments may be replaced with a known configuration having a similar configuration. In addition, at least part of the configurations of the above embodiments may be added to or replaced with the configuration of another of the embodiments.

The in-vehicle radar apparatus of one embodiment includes an interference determination means, a selection means, and a frequency changing means. The interference determination means determines presence or absence of interference between multifrequency CWs, which are radar waves, based on a beat signal generated by mixing a transmission signal and a received signal, which are radar waves. The selection means selects an own vehicle or an other-side apparatus, which is a party of the interference, according to an occurrence state of the interference, when the interference determination means determines that the interference is present. The frequency changing means that changes a center frequency of the multifrequency CW transmitted from the own vehicle, when the selection means selects the own vehicle.

According to the above configuration, since only one of the own vehicle and the other-side apparatus, which has caused interference, changes the center frequency of the multifrequency CW, the frequency of the noise component generated by the interference can be converted to a sufficiently high frequency band that can be easily separated from signal components. That is, since such a countermeasure is taken even if the interference between the multifrequency CWs occurs, the influence of the interference can be removed.

In addition, the in-vehicle radar apparatus of one embodiment may include an interference determination means and a frequency randomly changing means. The interference determination means determines presence or absence of interference between multifrequency CWs, each of which is a radar wave, based on a beat signal generated by mixing a transmission signal and a received signal, which are radar waves. The frequency randomly changing means randomly changes a center frequency of the multifrequency CW transmitted from an own vehicle within a predetermined acceptable frequency range, when the interference determination means determines that the interference is present.

According to the above configuration, both the own vehicle and the other-side apparatus, which have caused interference, randomly change the center frequency of the multifrequency CW. As a result, after the change, the frequency of a noise component generated by the interference is converted to a sufficiently high frequency band that can be easily separated from signal components, in most cases. That is, since such a countermeasure is taken even if the interference between the multifrequency CWs occurs, the influence of the interference can be removed.

Note that signs in parentheses written in claims indicate correspondence relationships with specific means written in the described embodiments as one aspect, and do not limit the technical scope of the present invention.

In addition, the present invention can be achieved in various forms, in addition to the in-vehicle radar apparatus described above, such as various systems including the in-vehicle radar apparatus as a component, a program for allowing a computer to function as the in-vehicle radar apparatus, and an interference avoidance method.

The invention claimed is:

1. An in-vehicle radar apparatus, comprising:
an interference determiner, using a processor, that determines presence or absence of interference between multifrequency CWs, which are radar waves, based on a beat signal generated by mixing a transmission signal and a received signal, which are radar waves;
a selector, using the processor, that selects an own apparatus or an other-side apparatus, in response to the interference determiner determining that interference is present and according to:
 a timing at which interference occurs during a transmission period of a multifrequency CW of the own apparatus due to a difference between transmission timings of a transmission wave from the own apparatus and an interference wave from the other-side apparatus, which is a party of the interference, the own apparatus being selected in response to interference occurring at a start side end of a transmission period of the multifrequency CW of the own apparatus and the other-side apparatus being selected in response to interference occurring at an end side end of a transmission period of the multifrequency CW of the own apparatus; or
 which frequencies of the transmission wave and the interference wave is higher; and
a frequency changer, using the processor, that changes a center frequency of the multifrequency CW transmitted from the own apparatus, in response to the selector selecting the own apparatus.

2. The in-vehicle radar apparatus according to claim 1, wherein the interference determiner extracts an interval including a signal component having a frequency equal to or more than a difference frequency between the multifrequency CWs, in a time waveform of the beat signal, as an interference interval, and determines that interference is present based on a length of the interference interval being equal to or more than a predetermined time threshold value.

3. The in-vehicle radar apparatus according to claim 2, wherein the predetermined time threshold value is set to a value larger than a length of a time period during which interference between FMCWs or interference between an FMCW and a multifrequency CW is continuously detected.

4. The in-vehicle radar apparatus according to claim 1, wherein the selector determines a selection based on whether the interference is detected at a start side end or an end side end of a transmission period of the multifrequency CW of the own apparatus.

5. The in-vehicle radar apparatus according to claim 1, wherein the selector determines a selection based on whether a frequency of a radar wave transmitted by the other-side apparatus is higher or lower than a frequency of a radar wave transmitted from the own apparatus.

6. The in-vehicle radar apparatus according to claim 1, wherein the frequency changer changes the center frequency of the multifrequency CW by 10 times or more a difference frequency between the multifrequency CWs.

7. The in-vehicle radar apparatus according to claim 1, further comprising a frequency resetter, using the processor, that returns the center frequency to a predetermined initial value, in response to the center frequency being changed by the frequency changer, and in response to a waiting time, which is predetermined, having passed.

8. The in-vehicle radar apparatus according to claim 7, wherein the waiting time is variably set depending on vehicle speed of an own vehicle, and is shorter as the vehicle speed is higher.

9. The in-vehicle radar apparatus according to claim 7, wherein the waiting time is variably set depending on setting of gears of a transmission, and the waiting time set for the gears being set to forward travel is shorter than the waiting time set for the gears being set to reverse travel.

10. An in-vehicle radar apparatus, comprising:
an interference determiner, using a processor, that determines presence or absence of interference between multifrequency CWs, each of which is a radar wave, based on a beat signal generated by mixing a transmission signal and a received signal, which are radar waves; and
a frequency randomly changer, using the processor, that randomly changes a center frequency of a multifrequency CW transmitted from an own apparatus within a predetermined acceptable frequency range, in response to the interference determiner determining that interference is present, a length of an interference interval is greater than or equal to a threshold value and the interference interval has been generated at a start of a modulation.

* * * * *